US008010617B2

(12) United States Patent
Zhuo et al.

(10) Patent No.: US 8,010,617 B2
(45) Date of Patent: Aug. 30, 2011

(54) SECURING SERIAL CONSOLE REDIRECTION VIA SERIAL-OVER-LAN (SOL)

(75) Inventors: Haihong Zhuo, Austin, TX (US); Weimin Pan, Austin, TX (US); Anil V. Rao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1170 days.

(21) Appl. No.: 11/284,939

(22) Filed: Nov. 22, 2005

(65) Prior Publication Data

US 2007/0118641 A1 May 24, 2007

(51) Int. Cl.
G06F 15/16 (2006.01)
(52) U.S. Cl. ........ 709/208; 709/212; 709/217; 709/225; 709/245
(58) Field of Classification Search .................. 709/217, 709/218, 208, 212, 225, 245
See application file for complete search history.

(56) References Cited

U.S. PATENT DOCUMENTS

| 6,317,798 | B1  |   | 11/2001 | Graf ............................... 710/15 |
| 7,484,084 | B1* |   | 1/2009  | Ranaweera et al. ............... 713/1 |
| 2004/0139373 | A1* | 7/2004 | Brown ............................. 714/47 |
| 2006/0034231 | A1* | 2/2006 | Tailor ............................. 370/338 |
| 2006/0168099 | A1* | 7/2006 | Diamant ......................... 709/217 |
| 2006/0209680 | A1* | 9/2006 | Lee ................................. 370/217 |

OTHER PUBLICATIONS

Haihong, et al., *Special Edition: New-Generation Server Technology*, "Remote Management with the Baseboard Management Controller in Eighth-Generation Dell PowerEdge Servers," Reprinted from Dell Power Solutions, pp. 26-29, Oct. 2004.
Ragunathan, et al., *New-Generation Server Technology*, "Efficient BMC Configuration on Dell PowerEdge Servers Using the Dell Deployment Toolkit" Reprinted from Dell Power Solutions, pp. 32-36, Feb. 2005.
Rokov, Steve, *EETimes: CommsDesign*, "Making IPMI Work in ATCA Designs," http://www.commsdesign.com/showArticle.jhtml?articleID=52600461, pp. 1-5, Oct. 10, 2005.

* cited by examiner

Primary Examiner — Djenane M Bayard
(74) Attorney, Agent, or Firm — Baker Botts L.L.P.

(57) ABSTRACT

An information handling system has the capability of securing serial console redirection via serial-over-LAN (SOL) by using a baseboard management controller (BMC) and a baseboard serial controller. The BMC may be coupled to the baseboard serial controller over a DCD and/or GPIO bus. De-assertion of the data carriage detect (DCD) signal from the BMC to the baseboard serial controller may cause the OS console to logout the user session. If the BMC does not support a DCD signal then a general purpose input-output (GPIO) signal from the BMC may be used instead. Most operating system (OS) consoles will logout a user session when a de-asserted DCD (or GPIO) signal is detected.

34 Claims, 3 Drawing Sheets

SECURING SERIAL CONSOLE REDIRECTION VIA SERIAL-OVER-LAN (SOL)

TECHNICAL FIELD

The present disclosure relates generally to information handling systems and, more particularly, securing serial console redirection via serial-over-LAN (SOL) for information handling systems, e.g., servers.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Information handling systems are becoming more and more important in both business and personal life. Important and critical information handling systems may be remote and/or unattended such as for example, but not limited to, servers and/or storage devices. Users and/or administrators may access an information handling system over local serial Ethernet communications channels, e.g., local area networks (LANs) and/or over long distances, e.g., wide area networks (WANs) and the Internet by using serial-over-LAN (SOL). SOL is defined in the Intelligent Platform Management Interface (IPMI) specification (version 2.0), hereby incorporated by reference herein for all purposes.

SUMMARY

However, SOL does not provide a mechanism in an information handling system that may trigger an operating system (OS), e.g., Linux, console to logout a user when the SOL session is deactivated, the network interface card (NIC) is down, or the LAN connection is taken over. This lack of automatic user logout may create opportunities for security breaches. For example a remote user is logged into the information handling system OS via a SOL connection and forgot to logout before closing the SOL session. Another remote user can then gain access to the OS without having to re-login if this new user is able to redirect to the serial console via SOL. Another example is when a remote user is logged into the information handling system OS via a SOL connection and a hijacker unplugs the network cable to the server, e.g., to the NIC, and redirects the serial console (see FIG. 2). The information handling system baseboard management controller (BMC) may not detect the NIC link being down so as to trigger the OS to logout automatically, the hijacker now may have access to the OS. Still another example is when a remote user is logged in the information handling system OS via a SOL, e.g., LAN, connection and was redirecting a script over the SOL connection, then a hijacker took over the physical/logical segment of the LAN connection at the router/hub (see FIG. 3). The hijacker may hijack the script too and command the information handling system to do whatever the hijacker wants it to do.

According to a specific example embodiment of this disclosure, an information handing system may comprise a method of securing serial console redirection via serial-over-LAN (SOL) for an information handling system, comprising the steps of: detecting a serial-over-LAN (SOL) deactivated command with a baseboard management controller (BMC); monitoring a data carriage detect (DCD) signal from the BMC; de-asserting the DCD signal from the BMC when the SOL deactivated command is detected; and logging out an operating system (OS) user session when the DCD signal is de-asserted.

According to another specific example embodiment of this disclosure, an information handing system may comprise a method of securing serial console redirection via serial-over-LAN (SOL) for an information handling system, said method comprising the steps of: detecting a serial-over-LAN (SOL) deactivated command with a baseboard management controller (BMC); monitoring a general purpose input-output (GPIO) signal from the BMC; de-asserting the GPIO signal from the BMC when the SOL deactivated command is detected; and logging out an operating system (OS) user session when the GPIO signal is de-asserted.

According to yet another specific example embodiment of this disclosure, an information handing system may comprise a method of securing serial console redirection via serial-over-LAN (SOL) for an information handling system, said method comprising the steps of: determining when a network interface card (NIC) link is inactive for a certain length of time with a baseboard management controller (BMC); monitoring a data carriage detect (DCD) signal from the BMC; de-asserting the DCD signal from the BMC when the NIC link is inactive for the certain length of time; and logging out an operating system (OS) user session when the DCD signal is de-asserted.

According to still another specific example embodiment of this disclosure, an information handing system may comprise a method of securing serial console redirection via serial-over-LAN (SOL) for an information handling system, said method comprising the steps of: determining when a network interface card (NIC) link is inactive for a certain length of time with a baseboard management controller (BMC); monitoring a general purpose input-output (GPIO) signal from the BMC; de-asserting the GPIO signal from the BMC when the NIC link is inactive for the certain length of time; and logging out an operating system (OS) user session when the GPIO signal is de-asserted.

According to another specific example embodiment of this disclosure, an information handing system may comprise a method of securing serial console redirection via serial-over-LAN (SOL) for an information handling system, said method may comprise the steps of: determining when a SOL session changes with a baseboard management controller (BMC); monitoring a data carriage detect (DCD) signal from the BMC; de-asserting the DCD signal from the BMC when the SOL session changes; and logging out an operating system (OS) user session when the DCD signal is de-asserted.

According to another specific example embodiment of this disclosure, an information handling system may comprise a method of securing serial console redirection via serial-over-LAN (SOL) for an information handling system may comprise the steps of: determining when a SOL session changes with a baseboard management controller (BMC); monitoring a general purpose input-output (GPIO) signal from the BMC; de-asserting the GPIO signal from the BMC when the SOL session changes; and logging out an operating system (OS) user session when the GPIO signal is de-asserted.

According to another specific example embodiment of this disclosure, an information handling system having secure serial console redirection via serial-over-LAN (SOL) may comprise: a baseboard management controller (BMC) for detecting a serial-over-LAN (SOL) deactivated command; and a baseboard serial controller for monitoring a data carriage detect (DCD) signal from the BMC; wherein the BMC de-asserts the DCD signal when the SOL deactivated command is detected and the baseboard serial controller causes an operating system (OS) user session to logout when the DCD signal is de-asserted.

According to another specific example embodiment of this disclosure, an information handling system having secure serial console redirection via serial-over-LAN (SOL) may comprise: a baseboard management controller (BMC) for detecting a serial-over-LAN (SOL) deactivated command; and a baseboard serial controller for monitoring a general purpose input-output (GPIO) signal from the BMC; wherein the BMC de-asserts the GPIO signal when the SOL deactivated command is detected and the baseboard serial controller causes an operating system (OS) user session to logout when the DCD signal is de-asserted.

According to another specific example embodiment of this disclosure, an information handling system having secure serial console redirection via serial-over-LAN (SOL) may comprise: a baseboard management controller (BMC) for determining when a network interface card (NIC) link is inactive for a certain length of time; and a baseboard serial controller for monitoring a data carriage detect (DCD) signal from the BMC; wherein the BMC de-asserts the DCD signal when the NIC link is inactive for the certain length of time and the baseboard serial controller causes an operating system (OS) user session to logout when the DCD signal is de-asserted.

According to another specific example embodiment of this disclosure, an information handling system having secure serial console redirection via serial-over-LAN (SOL) may comprise: a baseboard management controller (BMC) for determining when a network interface card (NIC) link is inactive for a certain length of time; and a baseboard serial controller for monitoring a general purpose input-output (GPIO) signal from the BMC; wherein the BMC de-asserts the GPIO signal when the NIC link is inactive for the certain length of time and the baseboard serial controller causes an operating system (OS) user session to logout when the DCD signal is de-asserted.

According to another specific example embodiment of this disclosure, an information handling system having secure serial console redirection via serial-over-LAN (SOL) may comprise: a baseboard management controller (BMC) for determining when a SOL session changes; and a baseboard serial controller for monitoring a data carriage detect (DCD) signal from the BMC; wherein the BMC de-asserts the DCD signal when the SOL session changes and the baseboard serial controller causes an operating system (OS) user session to logout when the DCD signal is de-asserted.

According to another specific example embodiment of this disclosure, an information handling system having secure serial console redirection via serial-over-LAN (SOL) may comprise: a baseboard management controller (BMC) for determining when a SOL session changes; and a baseboard serial controller for monitoring a general purpose input-output (GPIO) signal from the BMC; wherein the BMC de-asserts the GPIO signal when the SOL session changes and the baseboard serial controller causes an operating system (OS) user session to logout when the DCD signal is de-asserted.

BRIEF DESCRIPTION OF THE DRAWINGS

A more complete understanding of the present disclosure thereof may be acquired by referring to the following description taken in conjunction with the accompanying drawings wherein.

Figure 1:
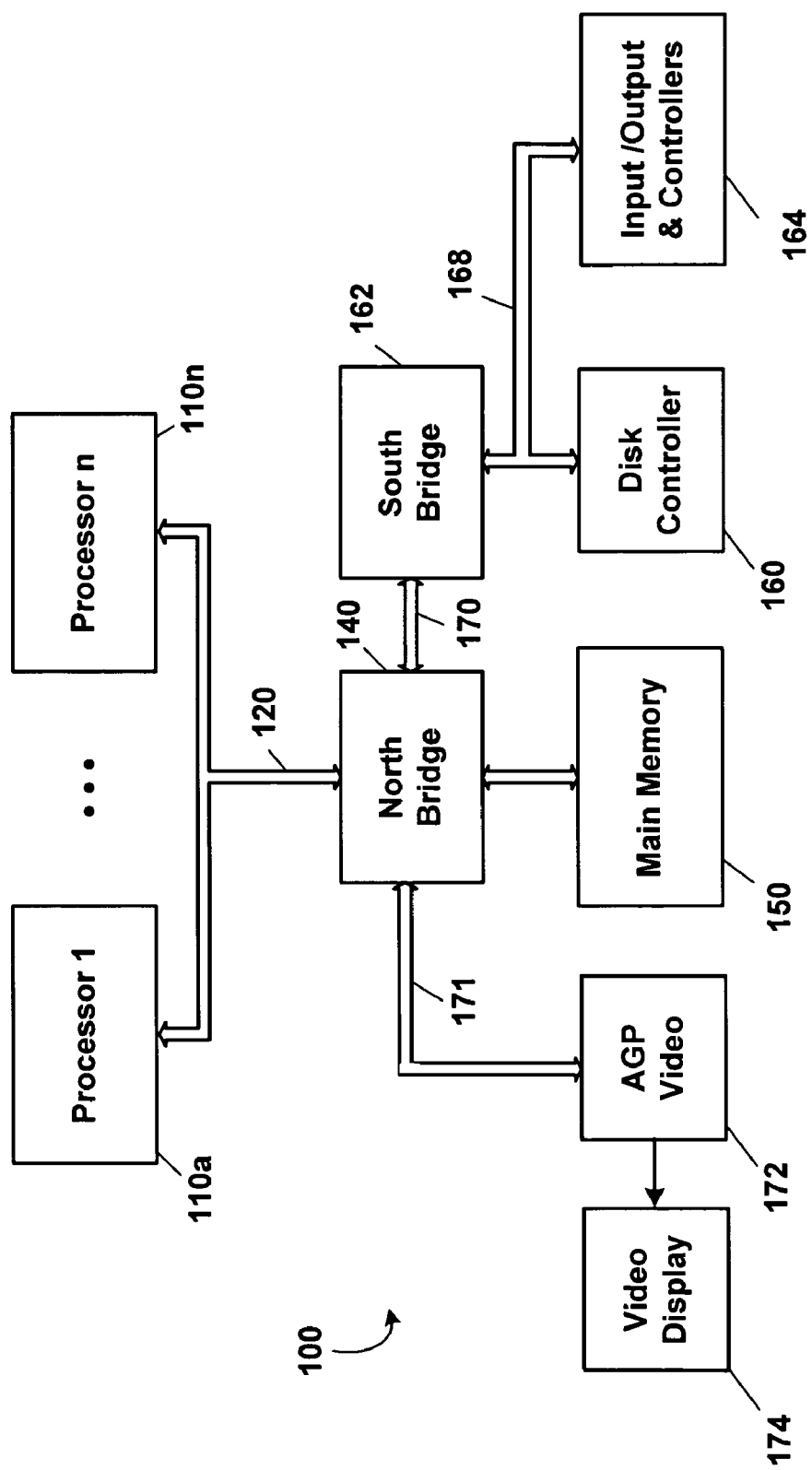
FIG. 1 is a schematic block diagram of an information handling system, according to specific example embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses, according to a specific example embodiment of the present disclosure. In one example embodiment, the information handling system is a computer system. The information handling system, generally referenced by the numeral 100, comprises a plurality of physical processors 110, generally represented by processors 110a-110n, coupled to a host bus(es) 120. A north bridge 140, which may also be referred to as a memory controller hub or a memory controller, is coupled to a main system memory 150. The north bridge 140 is coupled to the plurality of processors 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus 171 coupled to a video graphics interface 172 which drives a video display 174. A third bus(es) 168 may also comprise other industry standard buses or proprietary buses, e.g., ISA, SCSI, I$^2$C, SPI, USB buses through a south bridge(s) (bus interface) 162. A disk controller 160 and input/output interface(s) 164 may be coupled to the third bus(es) 168. At least one of the input/output interfaces 164 may be used in combination with a baseboard management controller, serial port and/or Ethernet network interface card (NIC) (see FIGS. 2 and 3).

Figure 2:
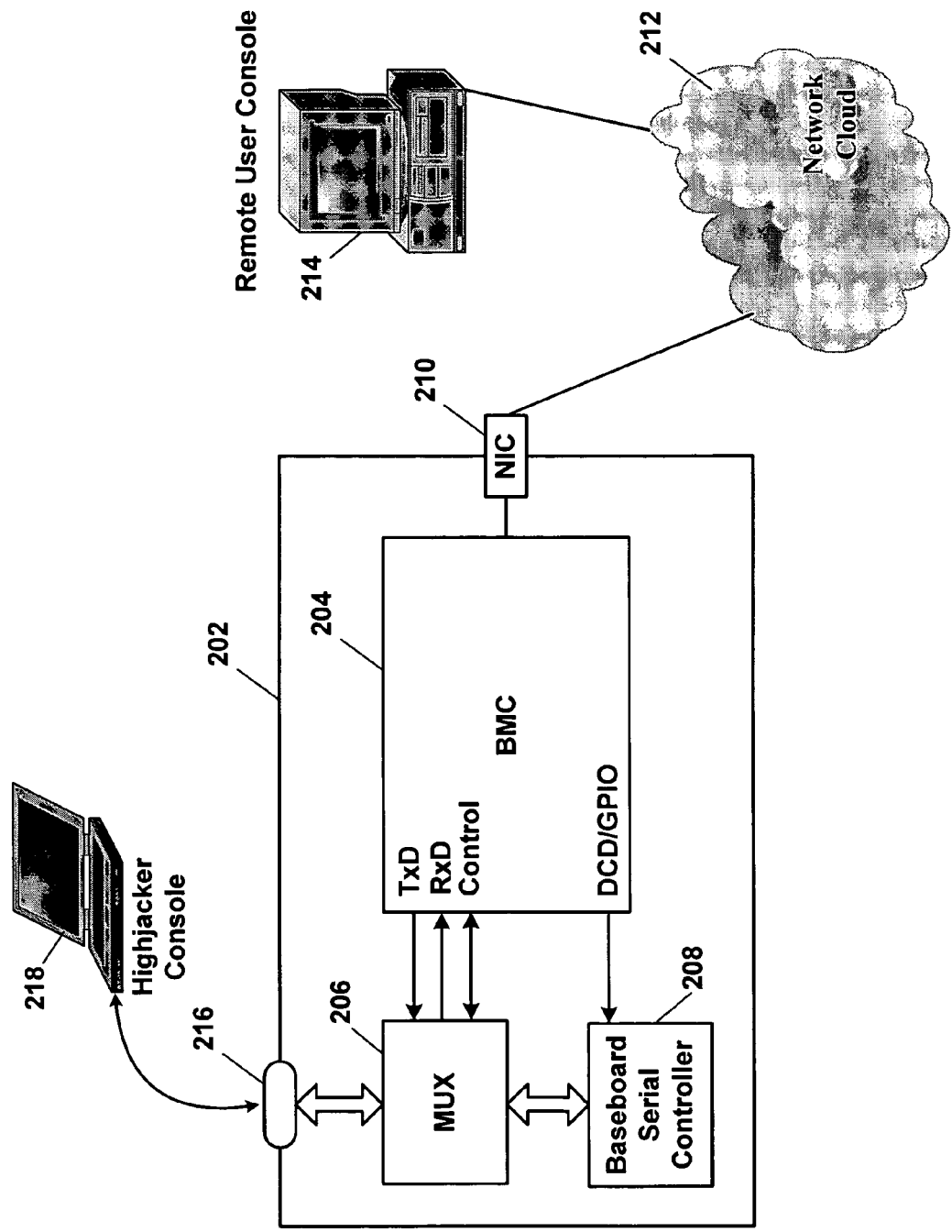
FIGS. 2 and 3 are schematic block diagrams of a portion of an information handling system having the capability of securing serial console redirection via serial-over-LAN (SOL), according to a specific example embodiment of the present disclosure.
Figure 3:
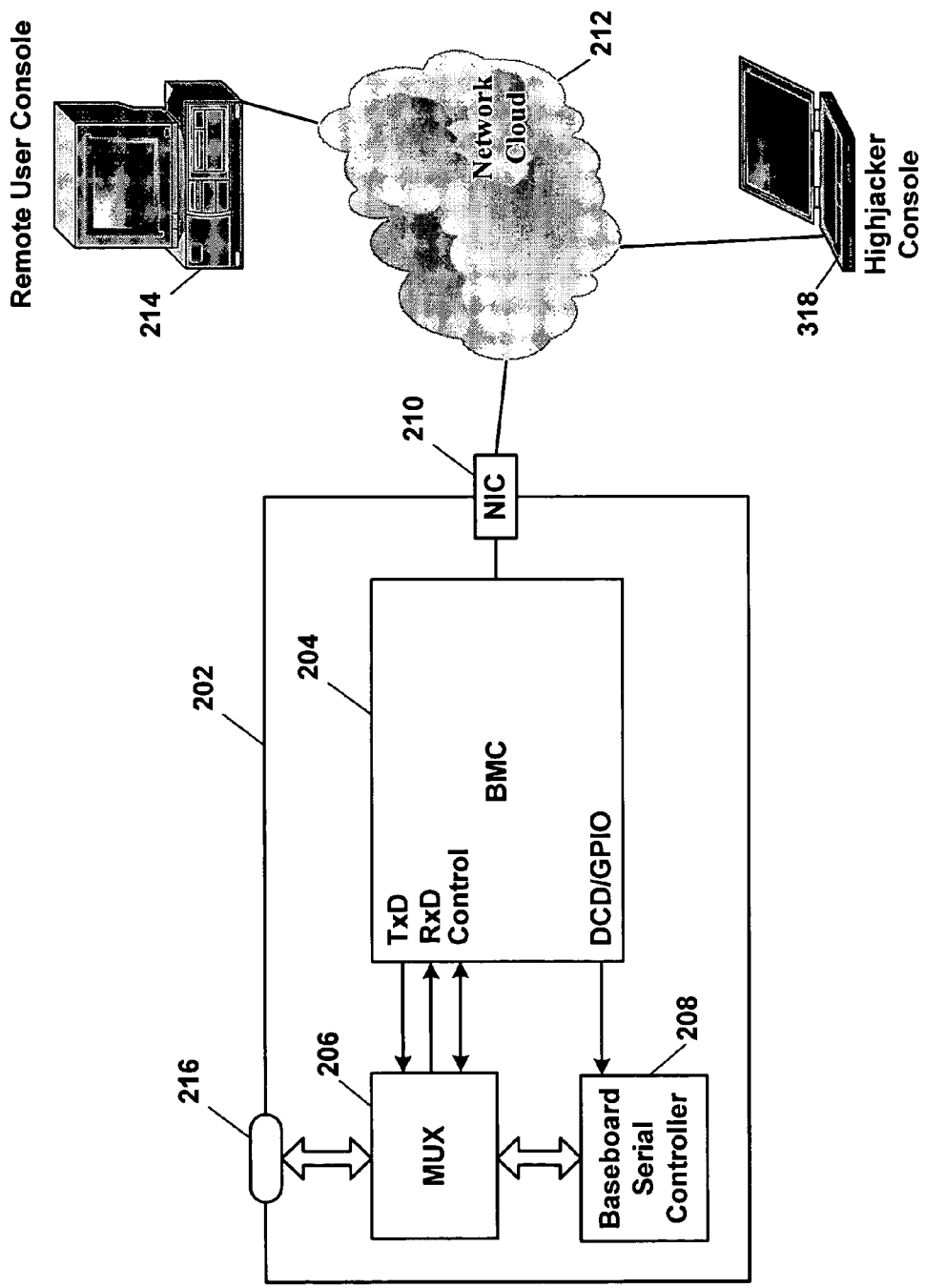

Referring now to FIGS. 2 and 3, depicted are schematic block diagrams of a portion of an information handling system having the capability of securing serial console redirection via serial-over-LAN (SOL), according to a specific example embodiment of the present disclosure. A subsystem 202 of the information handling system 100 may comprise a baseboard management controller (BMC) 204, a serial multiplexer 206, and a baseboard serial controller 208. Local serial devices (e.g., hijacker console 218—FIG. 2) may be coupled to the subsystem 202 through a serial port 216. An Ethernet LAN and the like may be coupled to the subsystem 202 through a NIC 210.

In FIG. 2 a remote user console 214 may be coupled to a network cloud 212, e.g., Internet, Intranet, Extranet, wide area network (WAN), WIFI, etc. The subsystem 202 may be coupled to the network cloud 212 through the NIC 210, e.g., Ethernet, and/or any other type of LAN/modem interface. A hijacker console 218 may be coupled directly to the serial port connector 216 of the subsystem 202. In FIG. 3, a hijacker console 318 may be coupled to the network cloud 212.

The BMC 204 may be coupled to the serial multiplexer 206 over a serial transmit line—TxD, a serial receive line—RxD, and a control bus. The BMC 204 may be coupled to the baseboard serial controller 208 over a DCD and/or GPIO bus. According to this disclosure, a de-asserted data carriage detect (DCD) signal from the BMC 204 to the baseboard serial controller 208 may cause the OS console to logout the user session. If the BMC 204 does not support a DCD signal then a general purpose input-output (GPIO) signal from the BMC 204 may be used instead.

When the BMC 204 receives a SOL deactivation command, it may de-assert the DCD signal. Most OS, e.g., link Linux, consoles will logout the user session when a de-asserted DCD (or GPIO) signal is detected.

When the BMC 204 detects that the link signal to the NIC 210 is no longer present for a certain length of time, it may assume that the network cable (e.g., Ethernet) connection has been lost. The BMC 204 may then de-assert the DCD (or GPIO) signal which may cause the OS console to logout the user session.

When the BMC 204 detects that the SOL session may have changed, e.g., a change of the session ID, it may de-assert the DCD (or GPIO) signal which may cause the OS console to logout the user session.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method of securing serial console redirection via serial-over-LAN (SOL) for an information handling system, said method comprising the steps of:
   coupling a baseboard management controller (BMC) to a serial multiplexer;
   detecting a serial-over-LAN (SOL) deactivated command with the BMC;
   monitoring a data carriage detect (DCD) signal from the BMC;
   de-asserting the DCD signal from the BMC when the SOL deactivated command is detected, wherein the BMC transmits the de-asserted DCD signal on an internal bus of the information handling system; and
   logging out an operating system (OS) user session when the DCD signal is de-asserted, wherein logging out an OS user session prevents local and remote access to the OS.

2. The method according to claim 1, wherein the OS user session is a OS console.

3. The method according to claim 1, wherein the step of monitoring the DCD signal from the BMC is done with a baseboard serial controller.

4. A method of securing serial console redirection via serial-over-LAN (SOL) for an information handling system, said method comprising the steps of:
   coupling a baseboard management controller (BMC) to a serial multiplexer;
   detecting a serial-over-LAN (SOL) deactivated command with the BMC;
   monitoring a general purpose input-output (GPIO) signal from the BMC;
   de-asserting the GPIO signal from the BMC when the SOL deactivated command is detected, wherein the BMC transmits the de-asserted GPIO signal on an internal bus of the information handling system; and
   logging out an operating system (OS) user session when the GPIO signal is de-asserted, wherein logging out an OS user session prevents local and remote access to the OS.

5. The method according to claim 4, wherein the OS user session is a OS console.

6. The method according to claim 4, wherein the step of monitoring the GPIO signal from the BMC is done with a baseboard serial controller.

7. A method of securing serial console redirection via serial-over-LAN (SOL) for an information handling system, said method comprising the steps of:
coupling a baseboard management controller (BMC) to a serial multiplexer;
determining when a network interface card (NIC) link is inactive for a certain length of time with the BMC;
monitoring a data carriage detect (DCD) signal from the BMC;
de-asserting the DCD signal from the BMC when the NIC link is inactive for the certain length of time, wherein the BMC transmits the de-asserted DCD signal on an internal bus of the information handling system; and
logging out an operating system (OS) user session when the DCD signal is de-asserted, wherein logging out an OS user session prevents local and remote access to the OS.

8. The method according to claim 7, wherein the OS user session is a OS console.

9. The method according to claim 7, wherein the step of monitoring the DCD signal from the BMC is done with a baseboard serial controller.

10. A method of securing serial console redirection via serial-over-LAN (SOL) for an information handling system, said method comprising the steps of:
coupling a baseboard management controller (BMC) to a serial multiplexer;
determining when a network interface card (NIC) link is inactive for a certain length of time with the BMC;
monitoring a general purpose input-output (GPIO) signal from the BMC;
de-asserting the GPIO signal from the BMC when the NIC link is inactive for the certain length of time, wherein the BMC transmits the de-asserted GPIO signal on an internal bus of the information handling system; and
logging out an operating system (OS) user session when the GPIO signal is de-asserted, wherein logging out an OS user session prevents local and remote access to the OS.

11. The method according to claim 10, wherein the OS user session is a OS console.

12. The method according to claim 10, wherein the step of monitoring the GPIO signal from the BMC is done with a baseboard serial controller.

13. A method of securing serial console redirection via serial-over-LAN (SOL) for an information handling system, said method comprising the steps of:
coupling a baseboard management controller (BMC) to a serial multiplexer;
determining when a SOL session changes with the BMC;
monitoring a data carriage detect (DCD) signal from the BMC;
de-asserting the DCD signal from the BMC when the SOL session changes, wherein the BMC transmits the de-asserted DCD signal on an internal bus of the information handling system; and
logging out an operating system (OS) user session when the DCD signal is de-asserted, wherein logging out an OS user session prevents local and remote access to the OS.

14. The method according to claim 13, wherein the OS user session is a OS console.

15. The method according to claim 13, wherein the step of monitoring the DCD signal from the BMC is done with a baseboard serial controller.

16. The method according to claim 13, wherein the change of the SOL session is a change of a SOL session ID.

17. A method of securing serial console redirection via serial-over-LAN (SOL) for an information handling system, said method comprising the steps of:
coupling a baseboard management controller (BMC) to a serial multiplexer;
determining when a SOL session changes with the BMC;
monitoring a general purpose input-output (GPIO) signal from the BMC;
de-asserting the GPIO signal from the BMC when the SOL session changes, wherein the BMC transmits the de-asserted GPIO signal on an internal bus of the information handling system; and
logging out an operating system (OS) user session when the GPIO signal is de-asserted, wherein logging out an OS user session prevents local and remote access to the OS.

18. The method according to claim 17, wherein the OS user session is a OS console.

19. The method according to claim 17, wherein the step of monitoring the GPIO signal from the BMC is done with a baseboard serial controller.

20. The method according to claim 17, wherein the change of the SOL session is a change of a SOL session ID.

21. An information handling system having secure serial console redirection via serial-over-LAN (SOL), said system comprising:
a baseboard management controller (BMC) for detecting a serial-over-LAN (SOL) deactivated command;
a serial multiplexer, wherein the serial multiplexer is coupled to the BMC; and
a baseboard serial controller for monitoring a data carriage detect (DCD) signal from the BMC;
wherein the BMC de-asserts the DCD signal when the SOL deactivated command is detected and the baseboard serial controller causes an operating system (OS) user session to logout when the DCD signal is de-asserted, wherein logging out an OS user session prevents local and remote access to the OS, and
wherein the BMC transmits the de-asserted DCD signal on an internal bus of the information handling system.

22. The system according to claim 21, wherein the OS user session is a OS console.

23. An information handling system having secure serial console redirection via serial-over-LAN (SOL), said system comprising:
a baseboard management controller (BMC) for detecting a serial-over-LAN (SOL) deactivated command;
a serial multiplexer, wherein the serial multiplexer is coupled to the BMC; and
a baseboard serial controller for monitoring a general purpose input-output (GPIO) signal from the BMC;
wherein the BMC de-asserts the GPIO signal when the SOL deactivated command is detected and the baseboard serial controller causes an operating system (OS) user session to logout when the GPIO signal is de-asserted, wherein logging out an OS user session prevents local and remote access to the OS, and
wherein the BMC transmits the de-asserted GPIO signal on an internal bus of the information handling system.

24. The system according to claim 23, wherein the OS user session is a OS console.

25. An information handling system having secure serial console redirection via serial-over-LAN (SOL), said system comprising:
- a baseboard management controller (BMC) for determining when a network interface card (NIC) link is inactive for a certain length of time;
- a serial multiplexer, wherein the serial multiplexer is coupled to the BMC; and
- a baseboard serial controller for monitoring a data carriage detect (DCD) signal from the BMC;
- wherein the BMC de-asserts the DCD signal when the NIC link is inactive for the certain length of time and the baseboard serial controller causes an operating system (OS) user session to logout when the DCD signal is de-asserted, wherein logging out an OS user session prevents local and remote access to the OS, and
- wherein the BMC transmits the de-asserted DCD signal on an internal bus of the information handling system.

26. The system according to claim 25, wherein the OS user session is a OS console.

27. An information handling system having secure serial console redirection via serial-over-LAN (SOL), said system comprising:
- a baseboard management controller (BMC) for determining when a network interface card (NIC) link is inactive for a certain length of time;
- a serial multiplexer, wherein the serial multiplexer is coupled to the BMC; and
- a baseboard serial controller for monitoring a general purpose input-output (GPIO) signal from the BMC;
- wherein the BMC de-asserts the GPIO signal when the NIC link is inactive for the certain length of time and the baseboard serial controller causes an operating system (OS) user session to logout when the GPIO signal is de-asserted, wherein logging out an OS user session prevents local and remote access to the OS, and
- wherein the BMC transmits the de-asserted GPIO signal on an internal bus of the information handling system.

28. The system according to claim 27, wherein the OS user session is a OS console.

29. An information handling system having secure serial console redirection via serial-over-LAN (SOL), said system comprising:
- a baseboard management controller (BMC) for determining when a SOL session changes;
- a serial multiplexer, wherein the serial multiplexer is coupled to the BMC; and
- a baseboard serial controller for monitoring a data carriage detect (DCD) signal from the BMC;
- wherein the BMC de-asserts the DCD signal when the SOL session changes and the baseboard serial controller causes an operating system (OS) user session to logout when the DCD signal is de-asserted, wherein logging out an OS user session prevents local and remote access to the OS, and
- wherein the BMC transmits the de-asserted DCD signal on an internal bus of the information handling system.

30. The method according to claim 29, wherein the OS user session is a OS console.

31. The method according to claim 29, wherein the change of the SOL session is a change of a SOL session ID.

32. An information handling system having secure serial console redirection via serial-over-LAN (SOL), said system comprising:
- a baseboard management controller (BMC) for determining when a SOL session changes;
- a serial multiplexer, wherein the serial multiplexer is coupled to the BMC; and
- a baseboard serial controller for monitoring a general purpose input-output (GPIO) signal from the BMC;
- wherein the BMC de-asserts the GPIO signal when the SOL session changes and the baseboard serial controller causes an operating system (OS) user session to logout when the GPIO signal is de-asserted, wherein logging out an OS user session prevents local and remote access to the OS, and
- wherein the BMC transmits the de-asserted GPIO signal on an internal bus of the information handling system.

33. The method according to claim 32, wherein the OS user session is a OS console.

34. The method according to claim 32, wherein the change of the SOL session is a change of a SOL session ID.

* * * * *